(12) United States Patent
Lopez Herreros (10) Patent No.: US 8,849,624 B2
(45) Date of Patent: Sep. 30, 2014

(54) SIMULATION METHODS AND SYSTEMS FOR THE CONTROL PANELS OF COMPLEX SYSTEMS

(75) Inventor: Israel Lopez Herreros, Madrid (ES)

(73) Assignee: Eads Construcciones Aeronauticas, S.A., Madrid (ES)

( * ) Notice: Subject to any disclaimer, the term of this patent is extended or adjusted under 35 U.S.C. 154(b) by 314 days.

(21) Appl. No.: 13/295,664

(22) Filed: Nov. 14, 2011

(65) Prior Publication Data

US 2012/0143581 A1    Jun. 7, 2012

(30) Foreign Application Priority Data

Nov. 12, 2010    (EP) ..................................... 10190993

(51) Int. Cl.
*G06F 17/50* (2006.01)
*G09B 9/00* (2006.01)

(52) U.S. Cl.
CPC ........................................ *G09B 9/00* (2013.01)
USPC ........ 703/2; 703/6; 703/22; 703/24; 345/157; 345/158; 345/161

(58) Field of Classification Search
CPC ............ G06F 17/50; G06F 19/00; G09B 9/00
USPC ............................................. 703/2, 6, 22, 24
See application file for complete search history.

(56) References Cited

U.S. PATENT DOCUMENTS

| | | | | |
|---|---|---|---|---|
| 5,734,373 A | * | 3/1998 | Rosenberg et al. | 345/161 |
| 6,020,876 A | * | 2/2000 | Rosenberg et al. | 345/157 |
| 6,219,032 B1 | * | 4/2001 | Rosenberg et al. | 345/157 |
| 8,368,641 B2 | * | 2/2013 | Tremblay et al. | 345/156 |

OTHER PUBLICATIONS

Search Report issued May 3, 2011 in European Application No. 10190993.5.
International Search Report and Written Opinion issued Mar. 28, 2012 in Application No. PCT/ES2011/070779.

* cited by examiner

*Primary Examiner* — Thai Phan
(74) *Attorney, Agent, or Firm* — Oblon, Spivak, McClelland, Maier & Neustadt, L.L.P.

(57) ABSTRACT

Simulation system for a control center of a complex system such as an aircraft (23) made up of one or more control panels (11) with a set of control devices (31, 33, 35, 37, 39) for components of said complex system, comprising a suitable computer system for the simulation of the operation of said control panels (11) by using virtual panels (11') which include simulated control devices (31', 33', 35', 37', 39'), implemented in screens (10) which are connected to the components controlled by said control panels (11), or to a simulating device for said connections, so that the signals or variables corresponding to the controlled components are assigned to their corresponding simulated control devices (31', 33', 35', 37', 39') in the virtual panels (11'). The invention also refers to a computer-implemented method for the generation of the graphic interface (21) said virtual panels (11').

16 Claims, 6 Drawing Sheets

Fig. 7

SIMULATION METHODS AND SYSTEMS FOR THE CONTROL PANELS OF COMPLEX SYSTEMS

FIELD OF THE INVENTION

The present invention refers to simulation methods and systems for control panels of complex systems, particularly to simulation methods and systems for the control panels situated in aircraft cockpits/aircraft operator's consoles.

BACKGROUND OF THE INVENTION

The control panels situated in an aircraft pilot cockpit are composed of a great number of control devices placed in a very small space so that they can be managed by the pilots, which means their design is complicated. Even though said complexity suggests the use of simulation systems during the design process, there are not any simulation systems known for aircraft pilot cockpits or for control panels for other complex systems.

In fact, in the case of aircrafts, the design process of the cockpits consists of two steps:
  The execution of a graphic design of the cockpit panels by a specialized design team.
  The construction of the cockpit panels based on said graphic design.

This means that the responsibility of obtaining an optimum design is concentrated in the graphic design step, as any subsequent change that might be needed would require a change in the already constructed cockpit.

Figure 1:
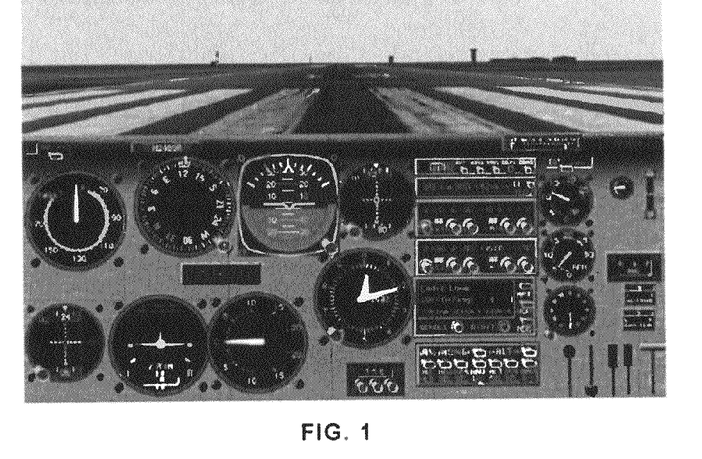
FIGS. 1 and 2 show virtual panels known in the art.

In the prior art there are known virtual panels constructed by using ad-hoc computer programs written using programming languages with graphic libraries such as OpenGL, DirectX, Java2D/Java3D. FIG. 1 shows an example of a cockpit made using these programs with basic elements which are not representative in size and location for enabling the evaluation of a real cockpit.

Figure 2:
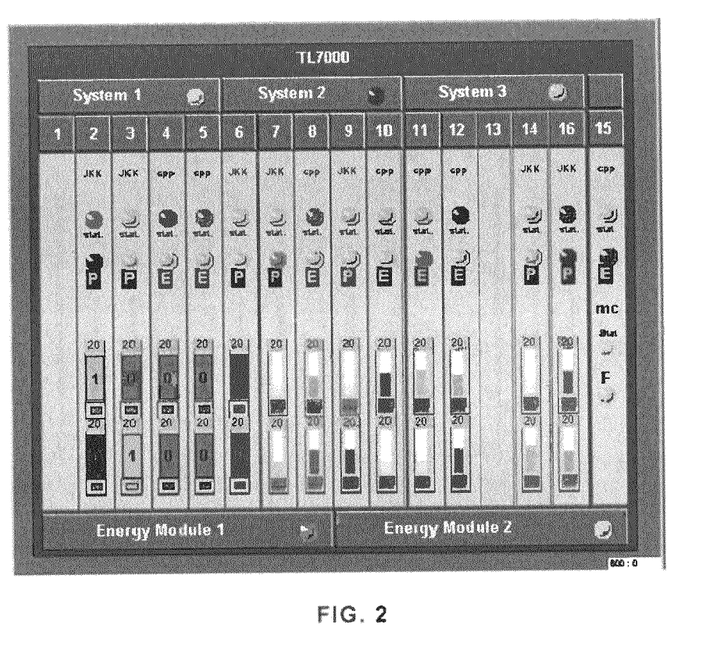

In the prior art there are also known virtual panels constructed using WYSIWYG ("What You See Is What You Get") tools usually employed in the design of graphic interfaces such as Views, SL-GMS, ó GV.net. FIG. 2 shows an example of a panel developed using the SL-GMS graphic library. These tools have a limited number of graphic elements. They do not contain the necessary controls needed to design a cockpit and they are not representative for carrying out cockpit design evaluations.

In the first case, general purpose technologies are used so they are not appropriate for aircraft cockpits/consoles or any other complex control centre, which have very specific problems; and in the second case, they are technologies applied to the specific environment to which they are destined and there are none, as said before, oriented towards aircraft cockpits/consoles.

Given the time and the costs employed in the design process of aircraft cockpits used nowadays by aircraft manufacturers, there is a great demand for methods and systems which may reduce them, and the present invention is oriented toward satisfying said demand.

SUMMARY OF THE INVENTION

An object of the present invention is to provide a simulation system for the control panels of complex systems, particularly in aircrafts, which enables the optimization of their design process.

Another object of the present invention is to provide a simulation system for control panels of complex systems, particularly in aircrafts, in which the simulated panels are connected to the controlled components.

In one aspect, these and other objects are met by a simulation system of a complex system made up of one or more control panels with a set of control devices for the components of said complex system which comprises an suitable computer system to simulate the operation of said control panels by virtual panels which include simulated control devices implemented in screens which are connected to the components controlled by said control panels, or to a device which simulates said connections, so that the signals or variables corresponding to the controlled components are assigned to their corresponding simulated control devices in the virtual panels.

In a preferred embodiment, said computer system comprises a module for the generation of the graphic interface of the virtual panels with processing means for its generation from a digital image of the control panel and a simulated control devices database, and an implementation module of the virtual panels with processing means to implement them with said graphic interface in screens connected to the controlled components. The simulation system thus achieved can be used directly by the control panel designers, without them requiring any specific computer knowledge.

In a preferred embodiment one or more control panels of an aircraft are simulated by virtual panels, including control devices such as switches, pushbuttons, rotatory buttons, displays or leds, which can be found in different states in relation to, at least, their position or illumination. The simulation system thus achieved enables the aircraft cockpit designers to evaluate in operating conditions their control panels design projects, avoiding the costly modifications that a change in a real panel would require.

In another aspect, the aforementioned objectives are met by a computer-implemented method for the generation of the graphic interface of a virtual panel of the aforementioned simulation system which comprises the following steps: a) to provide a digital image of the control panel to be simulated; b) to provide a database of the simulated control devices of all the control devices included in said panel; c) to recognize each of the portions of the digital image of the control panel which correspond to said control devices; d) to generate the graphic interface of the simulated virtual panel by substituting said digital portions with simulated control devices.

In a preferred embodiment step c) of said method is carried out in the following steps: c1) to obtain the template image of one of said simulated control devices and to assign to it a sub-sampling factor and a tolerance level according to its characteristics; c2) to scan the whole digital image in search for said image-template by comparing the template image pixels, determined by said sub-sampling factor, except for the transparent pixels, with all the pixels in the digital image; c3) to assign to said template image the portion or portions of the digital image which present a similarity level higher than a predetermined value and lower than said tolerance level, unless another template image had been previously assigned to any of said portions of the digital image with a higher level of similarity; c4) to repeat steps c1), c2) y c3) for all the template images of all the simulated control devices.

Other characteristics and advantages of the present invention will be clear from the following detailed description of embodiments illustrative of its object in relation to the attached figures.

DETAILED DESCRIPTION OF PREFERRED EMBODIMENTS

What follows is a description of a preferred embodiment of the present invention for an aircraft cockpit.

The control panels arranged in an aircraft cockpit comprise a set of control devices, such as switches, different types of pushbuttons, rotary buttons of different shapes and sizes, displays or leds, and a set of indications printed out on them which refer to said devices and/or to the aircraft components they control.

Figure 3:
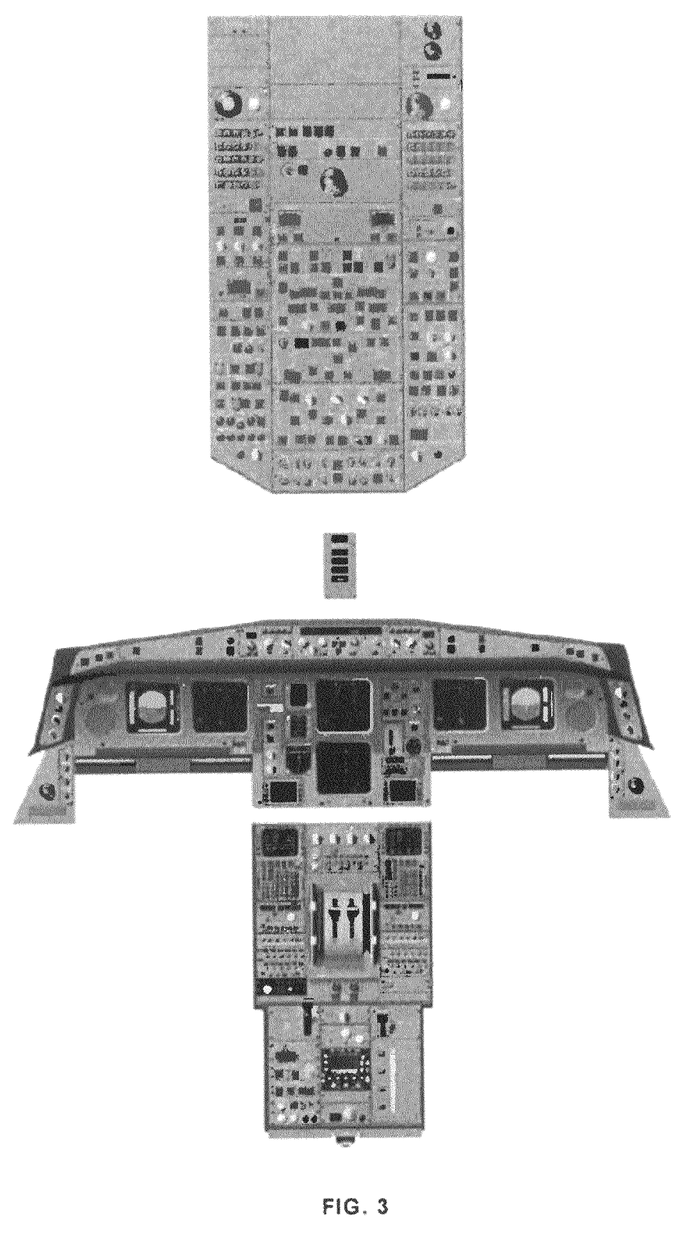
FIG. 3 is an image that shows the control panels of an aircraft cockpit whose simulation is object of a preferred embodiment of the present invention.

FIG. 3 is a representative image of an aircraft cockpit which illustrates the complexity of the design process of the panels which integrate it whose objective is to adequately distribute said control devices in the different panels or consoles in the cockpit so as to facilitate their operation for the pilots.

Figure 4:
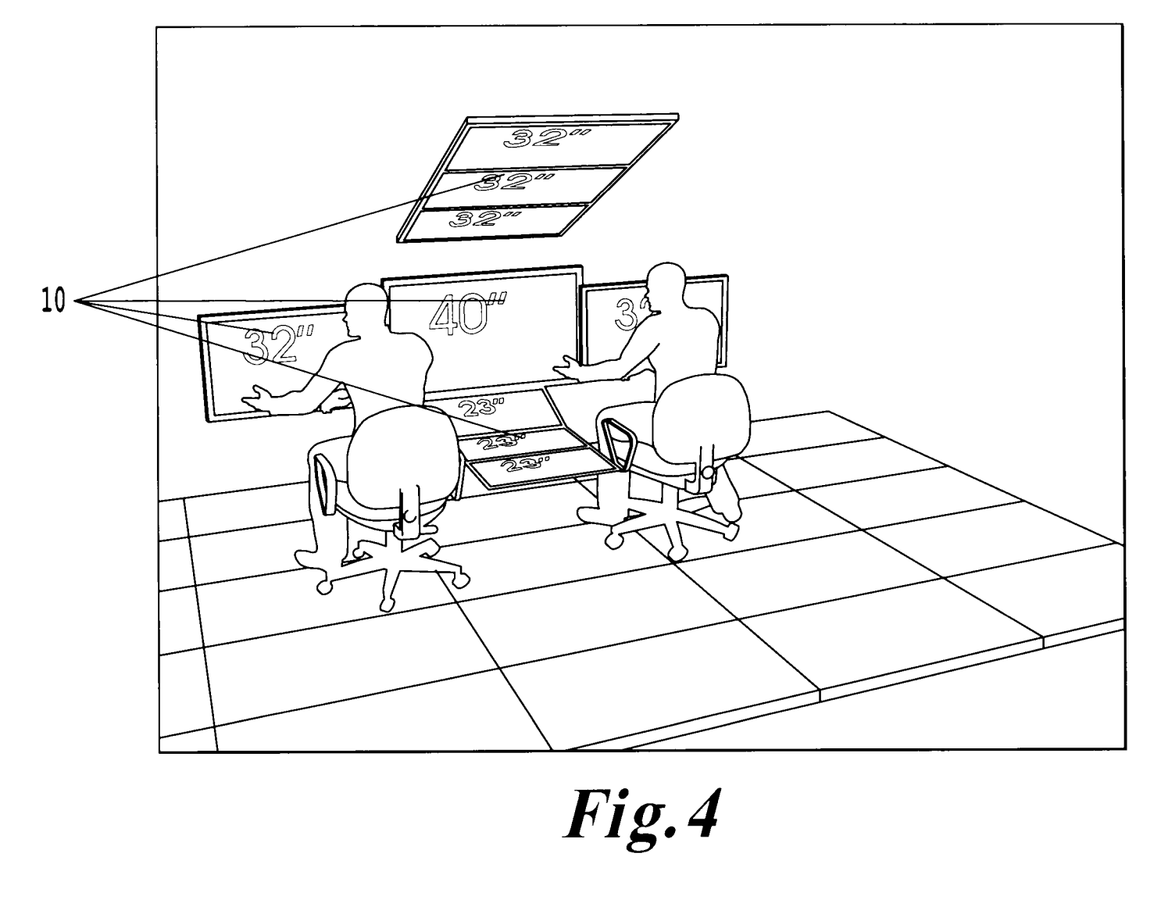
FIG. 4 is a schematic view in perspective of a simulation system of the panels of an aircraft cockpit according to the present invention.

Therefore, the basic idea of the present invention is to provide a simulation system for an aircraft cockpit like the one shown in FIG. 4 by means of several tactile screens 10 which contain the virtual panels which simulate the control panels of the cockpit, connected to the different aircraft components by using the real cabling of the aircraft or an ad-hoc simulation device of said connections, so that the state of the control devices of the virtual panels can change according to the signals received from the components controlled by them to evaluate their design and position.

To the effects of the present invention, virtual panel means a representation of the control panel which is to be simulated, which can be visualized on a screen, in which said control devices are identified individually and can be treated as individual objects, susceptible to adopt different states, so that said virtual panel allows carrying out operations in it simulating those which are carried out in the real control panel.

Using this simulation system, the cockpit designers can evaluate the design of the control panels and, in case it is needed, make changes to it, optimizing the design and construction process of the control panels of the cockpit.

Figure 5:
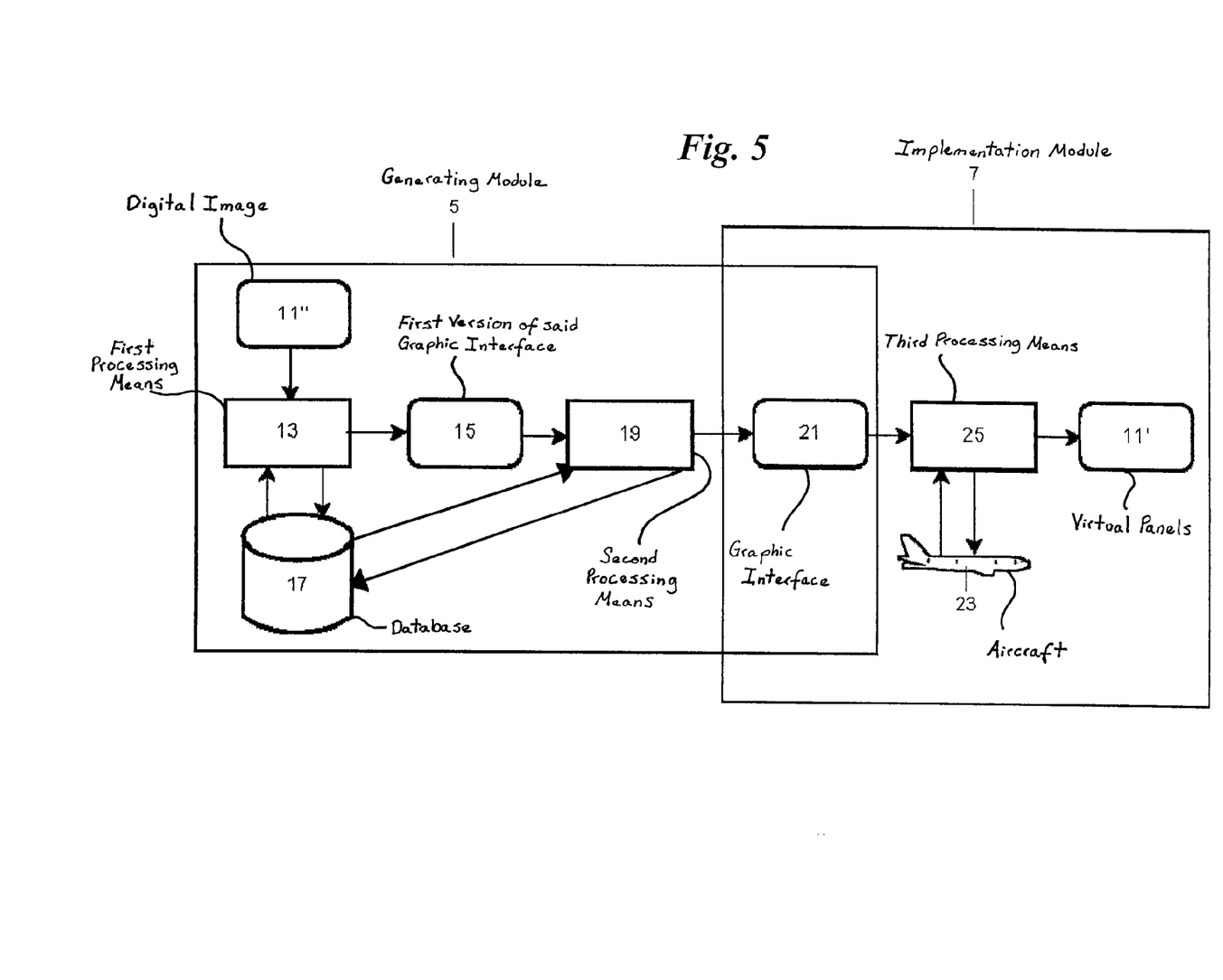
FIG. 5 is a block diagram which shows the generation of a virtual panel according to a preferred embodiment of the present invention.

This simulation system comprises a computer system which comprises: (see FIG. 5):

- A module 5 which generates the graphic interface 21 of the virtual panels 11' which comprises a first process 13 for the automatic generation of a first version 15 of said graphic interface from a digital image 11" of the panels usually provided by the cockpit design department and a second process 19 which permits its modification to obtain the definitive graphic interface 21 manually, so that the simulation system can be operated directly by the cockpit department personnel without requiring them to have any specific computer knowledge.
- A module 7 which enables the implementation of the virtual panel 11' on a screen 10 by connecting the devices of the graphic interface 21 with the aircraft components 23 so that operations can be carried out and supervised in said virtual panels 11' in a similar way to those carried out in real control panels.

Module for the Generation of the Graphic Interface of the Virtual Panels

The basic steps of a preferred embodiment of a computer-implemented method for the generation of the graphic interface of a virtual panel of a tanker aircraft 23 used in in-flight refueling operations according to the present invention will now be described.

a) To Provide a Digital Image of the Control Panel of the Aircraft.

Figure 6:
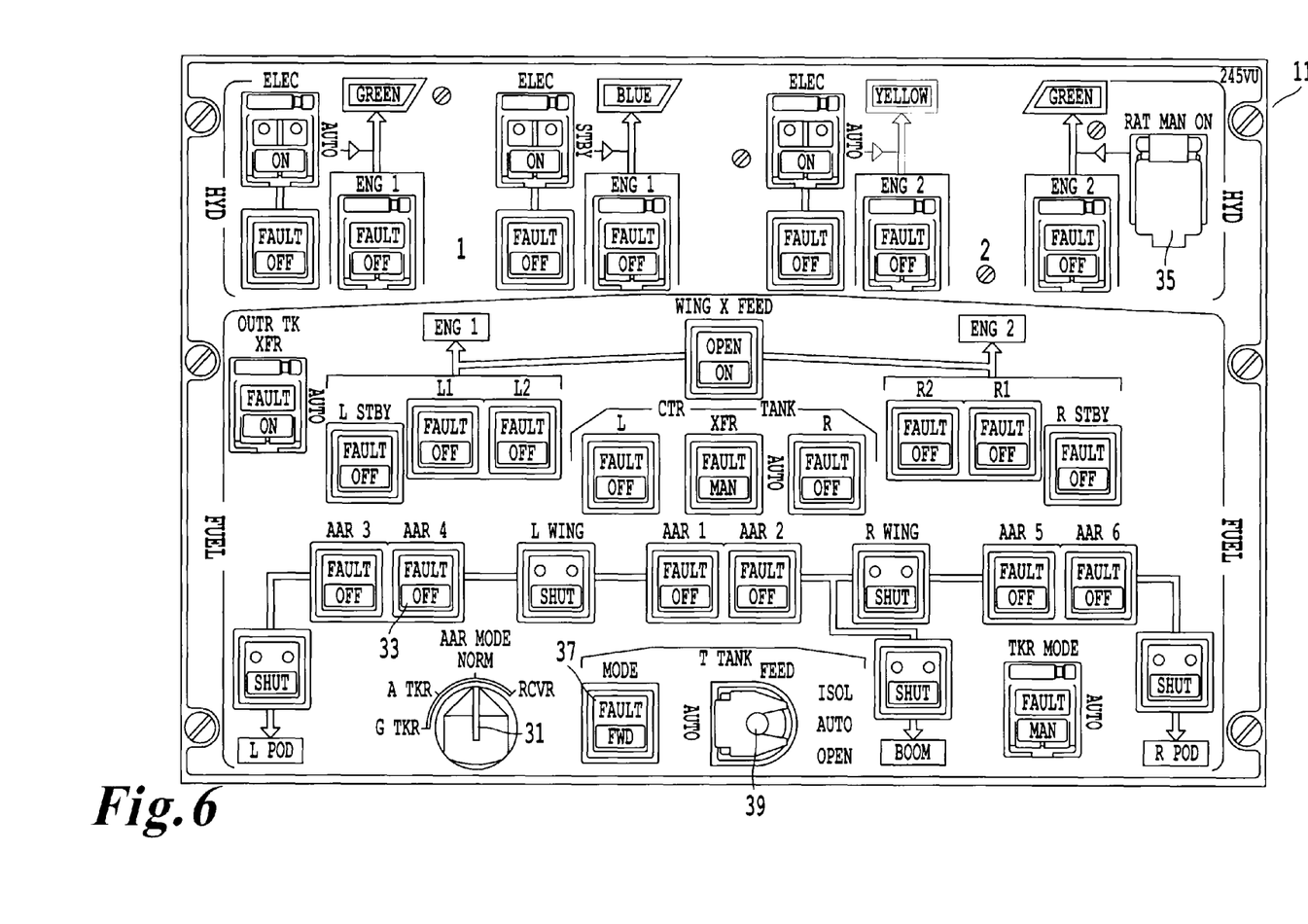
FIG. 6 shows a digital image of a control panel of an aircraft.

The first step is to provide a digital image 11" of the control panel 11 of the aircraft which is to be simulated, like the image on FIG. 6 in a known format, such as bmp or png.

In this image it can be seen that the panel 11 represented therein contains a number of control devices which can be activated by the pilot of the tanker aircraft, as well as labels and graphical elements which are used to identify the function of said devices, and their state if necessary. One of these control devices is, for example, the rotatory button 31 which has four different states indicated by the labels G TKR, A TKR, NORM, RCVR to select the aircraft's operating mode as aircraft on the ground, as a tanker aircraft, as a normal aircraft or as a receiver aircraft.

It is therefore a digital image 11" of a certain graphic design of a panel whose functionality is going to be simulated according to the present invention and, therefore, the state in which the control devices are represented in the aforementioned image is irrelevant. In the example mentioned, the rotatory button 31 is represented in the state designated by the label NORM, but it could be represented in any of the other three possible states.

b) To provide a set of templates of the control devices which can be found in the panel.

Once an image like the one shown in FIG. 6 is obtained, all the different control devices included are identified, and digital templates of them are provided with all the information necessary for their simulation, which are stored in the database 17.

So, for example, it is about identifying that:

- Element 33 is a pushbutton with two states and with labels which are illuminated when certain actions occur and that element 35 is a pushbutton without labels and with a protection cover. There are different types of pushbuttons: some can be anchored and some can not; some also have a cover to protect against a wrong keystroke.
- Element 31 is a rotatory button which can have different paths and a different number of positions.
- Element 39 is a switch with three positions and a security cover. There are several types of switches: their position can be horizontal or vertical and they can be able to anchor themselves and some can not.

There can be other control devices apart from the ones already mentioned such as displays, leds, digital sticks, etc.

If in FIG. 6 there was a control device not available in the database 17, it should be included by obtaining an image of it and by implementing its functionality.

c) Recognize the Control Devices in the Digital Image.

In process 13, the digital image 11" is processed using an image pattern recognizing tool to recognize the portions of the image which represent the control devices whose templates are stored in the database 17 and have been provided, along with their position in the image.

This image pattern recognizing tool is based on a digital image processing technique to find small parts of an image inside a global image by using an algorithm adapted to the requirements of the present invention based on the one described in http://en.wikipedia.org/wiki/Template matching.

Among the aspects to be taken into account in said adapted algorithm are the following:

- There are a great number of templates to handle (around 100 in the example considered of the tanker aircraft) and therefore the calculation time is very important in terms of its capability to be used.
- Taking into account the image transparencies is essential when identifying shapes which are not a square, which can happen in some elements like switches and rotatory buttons.
- The same control device must be identified as many times as it appears in the image. For example, FIG. 6 shows that there are several buttons which are the same as the button 33 (FAULT OFF).

In particular, the basic elements of the aforementioned adaptation are the following:

- Instead of comparing the template to the image pixel by pixel, a sub-sampling of the first is done to significantly reduce the number of comparisons. The sub-sampling factor of each template is calculated experimentally. In short, one can say that the more different a template is to the rest of the templates, its sub-sampling factor will be lower, and therefore, less comparisons will be needed to identify it. For example, in the case of the button 35, the fact that it is very different to the rest, means that only a few pixels have to be taken into account to identify it.
- If the sub-sampling is decreased in all templates, a very quick algorithm is achieved, but on the other hand, the elements could be identified incorrectly. For example, the button 33 (FAULT OFF) and the button 37 (FAULT FWD) are very similar, so if the number of pixels to be compared is reduced, it is possible that they may not be correctly identified. To avoid this, the concept of tolerance is introduced for every template to be searched, which specifies the maximum difference between the template and the image which marks the point from which it is considered that the template is not identified in the image. The tolerance value is also calculated experimentally. In the case of the very similar buttons 33 and 37 already mentioned, the tolerance values must be small to avoid identification errors. Ideally, tolerance levels are as low as possible, so that when searching only the elements searched are identified and none are left unfound. Usually, even though two buttons may be the same visually, if they are compared pixel by pixel it is not so, and because of this with the tolerance, certain small differences are permitted even when working with the same element.
- If in the same part of an image, several templates satisfy the tolerance, the one with the greater similarity to the image is selected. As the templates can have different sizes, the calculation of the similarity with the part of the image cannot be done absolutely, but as an average with respect to its size. Logically if one image is much bigger than another, its differences on a pixel level will be greater, so the image difference calculation must take into account its size.

d) Generate the Graphic Interface of the Simulated Virtual Panel.

Figure 7:
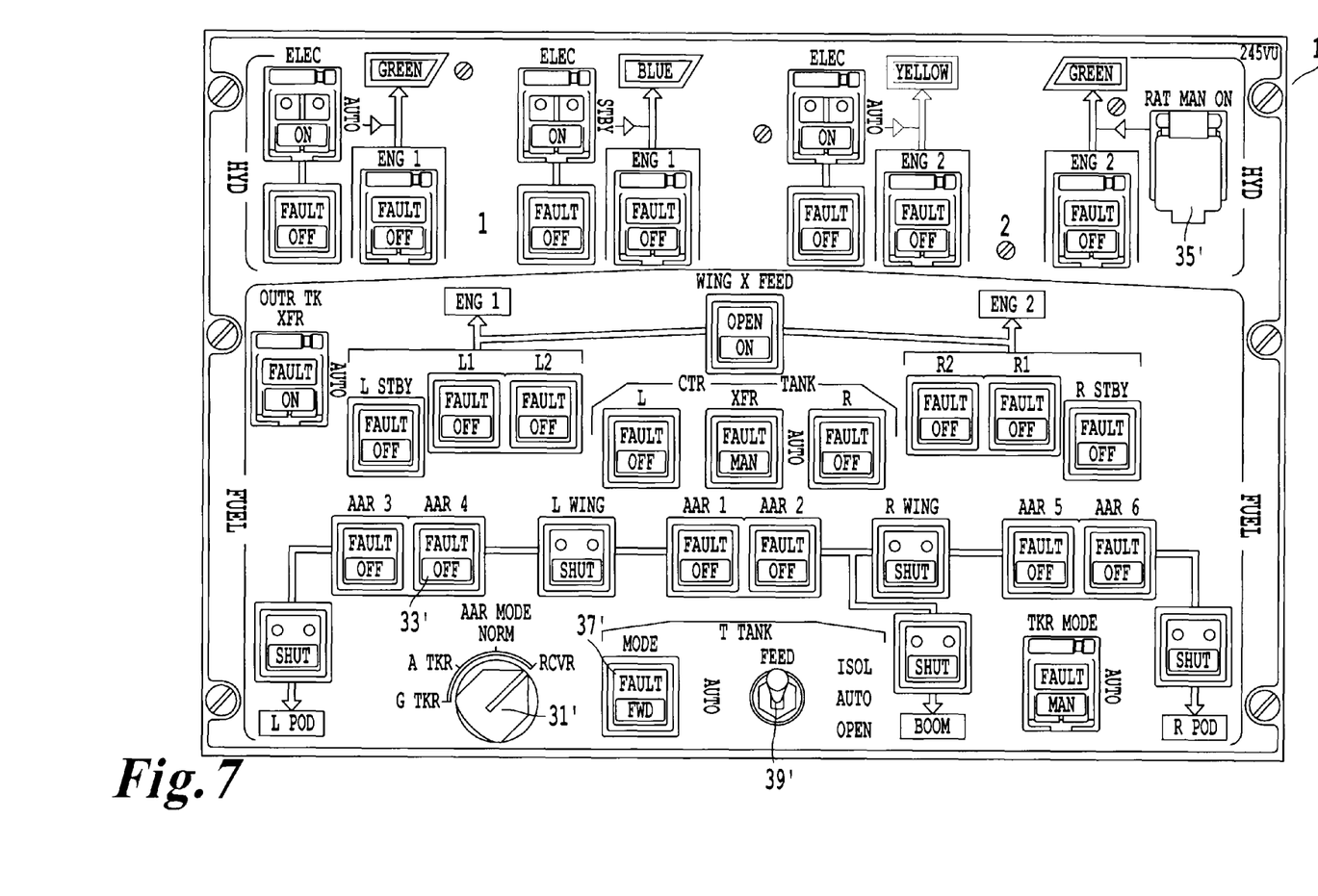
FIG. 7 shows an image of a simulated panel of said control panel generated according to a preferred embodiment of the present invention.

Secondly, in the process 13, a first version 15 of the graphic interface is obtained by substituting all the portions of the image 11" corresponding to the control devices with their templates, so that the image shown in FIG. 6 is transformed into an image similar to that in FIG. 7.

Therefore, for example, the image portions corresponding to the devices 11, 13, 15, 19 of FIG. 6 are substituted for the templates or simulated control devices 11', 13', 15', 19' of FIG. 7.

In the process 19, a cockpit editor is used which permits us to finally obtain the graphic interface 21 by correcting, in the first place, errors which arise in the previous process, for example by deleting incorrectly recognized elements, moving individual elements or adding new elements, and by completing, in second place, information which is not obtained in the image recognition phase; such as the information relative to the properties of the different control devices.

In a preferred embodiment of the present invention, the computer program used in the process 13 for the recognition of the control devices in the digital image 13 and the cockpit editor used in the process 19 have been implemented using the graphics library DirectX and are executed in high-performance computers:

System: Windows XP Service Pack 3
Computer: Intel Quad Core 2.66 Ghz, 2 Gb RAM
Performance: 25% of the set of CPUs
Screens of 27" and 21"
Development environment: Visual Studio 2008 Express The images in FIGS. 6 and 7 look the same but in the case of the virtual panel 11" in FIG. 7, the control devices can be handled as will be explained in the following section.

Module for the Implementation of the Virtual Panels

The objective of the module 7 is that the virtual panels may be handled with the interactivity necessary to simulate the behaviour of the real panel which will be later installed in the aircraft.

To that effect, this module must permit each control device included in the graphic interface 21 to be associated with the signals/variables which control its logic, such as its illumination, when it has it, or its position. For the communication with the aircraft components 23, in the process 25, any suitable system which permits the communication with the available interfaces in them (ARINC 429, AFDX, CanBus, 485, analogic/digital cards, . . . ) is used.

This way, the rotatory button 31', for example, can have four different states in the virtual panel, indicated by the labels G TKR, A TKR, NORM, RCVR, and the control devices will be able to be illuminated with different colour lights in the virtual panel.

Once the virtual panel 11' is implemented as described, it will be prepared to carry out evaluations and to check whether its design is adequate. If that were not the case, the design of the panel would have to be changed, so a new initial digital image would have to be generated, and the process would have to be repeated, although the signals/variables would only have to be associated to the control devices which would have changed their type or position. If the changes are minor, it may be quicker to manually modify the virtual panel directly by using the cockpit editor.

Advantages of the Invention

Among the advantages of the invention, the following must be mentioned:

- Once the module for the generation of the virtual panels is prepared, the implementation of the specific virtual panels is done in a very efficient and simple way. The automatic recognition is in charge of identifying all the possible types of control devices which are in the panels and it positions them in their place. The only work the user of the system has to do is to complete those properties of the control devices of impossible identification through the digital image and the assignment of the signals which control the logic of the control devices: their position and illumination.

The module which permits the creation and modification of the graphic interface of the virtual panels by people who do not need to be specialized in computer science is very versatile and optimizes the modifications to evaluate different designs very quickly.

As the logic of the control devices is developed by the assignment of signals/variables in the module for the implementation of the virtual panels, the system forces to a standard and normalized management of the different controls of the panels.

In comparison with the use of physical panels, the use of virtual panels is much less costly in terms of time/money/maintenance. Moreover, the same simulation system can be used for different panel dispositions and even for different aircraft models.

Once the system is prepared to identify all the control devices which can be presented in the panels, it is ready to be used by the design personnel. This permits the realization of an efficient iterative process for the modifications in the panel's appearance, as all the work can be carried out by said personnel, without the need for computer experts.

As the generation of virtual panels is automatic, it is much less prone to human errors.

Although the present invention has been fully described in connection with preferred embodiments, it is evident that modifications may be introduced within the scope thereof, not considering this as limited by these embodiments, but by the contents of the following claims.

The invention claimed is:

1. A simulation system for a control centre of a complex system made up of at least one control panel with a set of control devices for components of said complex system, comprising:
    a suitable computer system for the simulation of the operation of said at least one control panel by using virtual panels which include simulated control devices, implemented in screens, which are connected to at least one of: the components, which are controlled by said at least one control panel; and a simulating device for connections with the screens, so that at least one of signals and variables corresponding to the components controlled by said at least one control panel are assigned to their corresponding simulated control devices in the virtual panels.

2. The simulation system according to claim 1, wherein said suitable computer system comprises:
    a generating module for generating a graphic interface of the virtual panels, with first and second processing means to generate the graphic interface from a digital image of the at least one control panel and a database of the simulated control devices; and
    an implementation module for implementing the virtual panels with third processing means with said graphic interface in the screens which are connected to the components controlled by said at least one control panel.

3. The simulation system according to one of claims 1 and 2, wherein the at least one control panel corresponds to an aircraft and is simulated by the virtual panels.

4. The simulation system according to claim 3, wherein the simulated control devices in the virtual panels include at least switches, pushbuttons and rotatory buttons which are each configurable in different states based on at least one of positioning and illumination.

5. A computer-implemented method for the generation of the graphic interface of at least one of the virtual panels of the simulation system according to claim 4, comprising:
    a) providing a digital image of the at least one control panel, which is to be simulated;
    b) providing a database of the simulated control devices for each of the set of control devices included in said at least one control panel;
    c) recognizing each portion of the digital image of the at least one control panel which corresponds to each of said set of control devices; and
    d) generating, by processing circuitry, the graphic interface of the simulated virtual panel by substituting said digital portions with said simulated control devices.

6. The method according to claim 5, wherein step c) is carried out in the following stages:
    c1) obtaining a template image of one of said simulated control devices and assigning a sub-sampling factor and a tolerance level to said one of the simulated control devices according to characteristics said one of the simulated control devices;
    c2) scanning the whole digital image in search for said template image by comparing pixels of the template image, determined by said sub-sampling factor, except for transparent pixels, with all the pixels in the digital image;
    c3) assigning to said template image at least one portion of the digital image which presents a similarity level higher than a predetermined value and lower than said tolerance level, unless another template image had been previously assigned to any portion of the digital image with a higher level of similarity; and
    c4) repeating steps c1), c2) and c3) for all the template images of all the simulated control devices.

7. A non-transitory computer-readable storage medium having computer readable program codes embodied in the computer readable storage medium that, when executed cause a computer to execute the computer-implemented method according to claim 6.

8. A non-transitory computer-readable storage medium having computer readable program codes embodied in the computer readable storage medium that, when executed cause a computer to execute the computer-implemented method according to claim 5.

9. A computer-implemented method for the generation of the graphic interface of at least one of the virtual panels of the simulation system according to claim 3, comprising:
    a) providing a digital image of the at least one control panel, which is to be simulated;
    b) providing a database of the simulated control devices for each of the set of control devices included in said at least one control panel;
    c) recognizing each portion of the digital image of the at least one control panel which corresponds to each of said set of control devices; and
    d) generating, by processing circuitry, the graphic interface of the simulated virtual panel by substituting said digital portions with said simulated control devices.

10. The method according to claim 9, wherein step c) is carried out in the following stages:
    c1) obtaining a template image of one of said simulated control devices and assigning a sub-sampling factor and a tolerance level to said one of the simulated control devices according to characteristics said one of the simulated control devices;

c2) scanning the whole digital image in search for said template image by comparing pixels of the template image, determined by said sub-sampling factor, except for transparent pixels, with all the pixels in the digital image;

c3) assigning to said template image at least one portion of the digital image which presents a similarity level higher than a predetermined value and lower than said tolerance level, unless another template image had been previously assigned to any portion of the digital image with a higher level of similarity; and c4) repeating steps c1), c2) and c3) for all the template images of all the simulated control devices.

11. A non-transitory computer-readable storage medium having computer readable program codes embodied in the computer readable storage medium that, when executed cause a computer to execute the computer-implemented method according to claim 10.

12. A non-transitory computer-readable storage medium having computer readable program codes embodied in the computer readable storage medium that, when executed cause a computer to execute the computer-implemented method according to claim 9.

13. A computer-implemented method for the generation of the graphic interface of at least one of the virtual panels of the simulation system according to one of claims 8 and 9, comprising:
   a) providing a digital image of the at least one control panel, which is to be simulated;
   b) providing a database of the simulated control devices for each of the set of control devices included in said at least one control panel;
   c) recognizing each portion of the digital image of the at least one control panel which corresponds to each of said set of control devices; and
   d) generating, by processing circuitry, the graphic interface of the simulated virtual panel by substituting said digital portions with said simulated control devices.

14. The method according to claim 13, wherein step c) is carried out in the following stages:
   c1) obtaining a template image of one of said simulated control devices and assigning a sub-sampling factor and a tolerance level to said one of the simulated control devices according to characteristics said one of the simulated control devices;
   c2) scanning the whole digital image in search for said template image by comparing pixels of the template image, determined by said sub-sampling factor, except for transparent pixels, with all the pixels in the digital image;
   c3) assigning to said template image at least one portion of the digital image which presents a similarity level higher than a predetermined value and lower than said tolerance level, unless another template image had been previously assigned to any portion of the digital image with a higher level of similarity; and
   c4) repeating steps c1), c2) and c3) for all the template images of all the simulated control devices.

15. A non-transitory computer-readable storage medium having computer readable program codes embodied in the computer readable storage medium that, when executed cause a computer to execute the computer-implemented method according to claim 14.

16. A non-transitory computer-readable storage medium having computer readable program codes embodied in the computer readable storage medium that, when executed cause a computer to execute the computer-implemented method according to claim 13.

* * * * *